(No Model.) 2 Sheets—Sheet 1.
W. DEARBORN.
PICKER FEED COTTON GIN.
No. 319,964. Patented June 16, 1885.
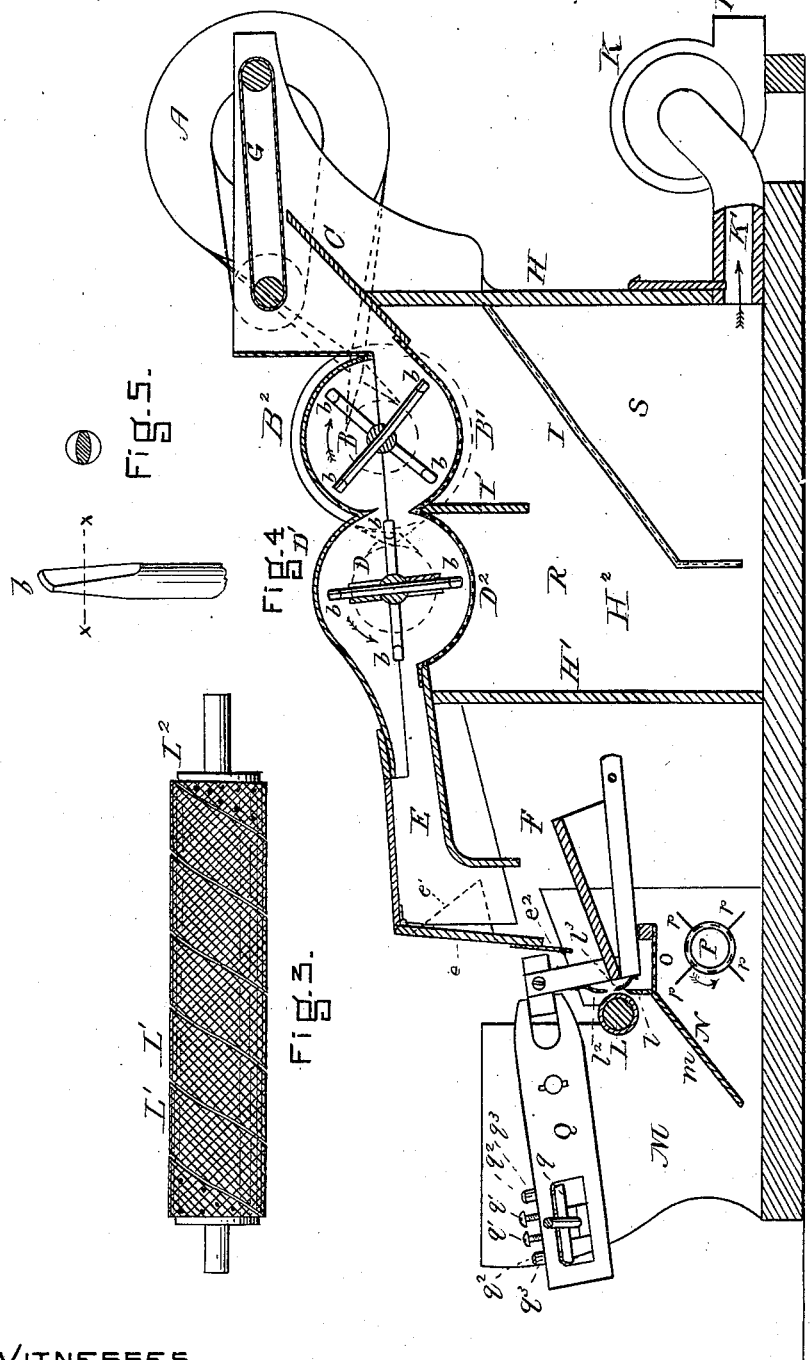
WITNESSES
Fred. R. Dolan
J. M. Dolan
INVENTOR
Wyman Dearborn
by his attys
Clarke & Raymond

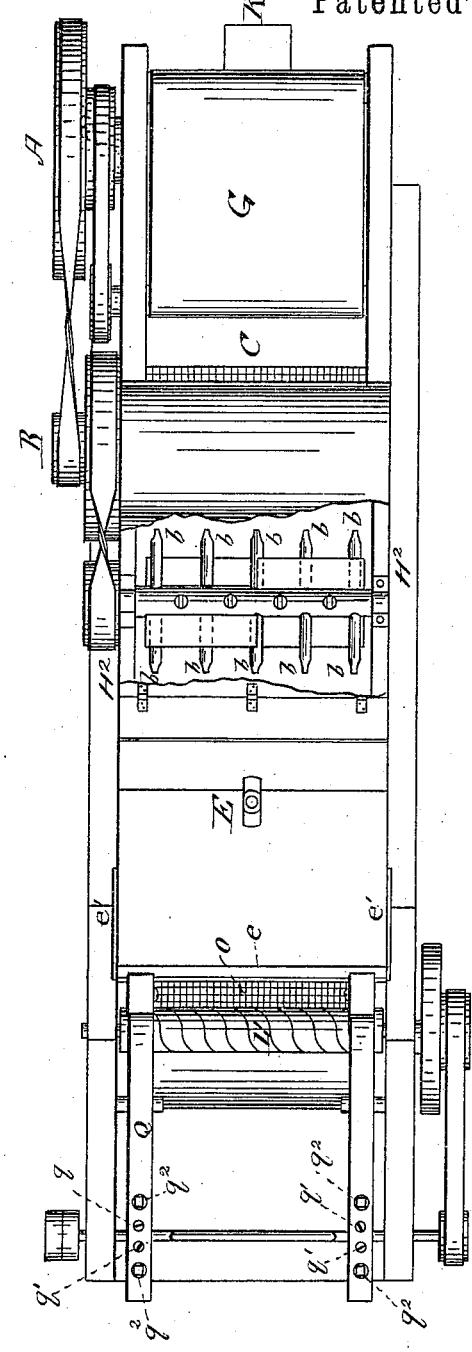

UNITED STATES PATENT OFFICE.

WYMAN DEARBORN, OF BOSTON, ASSIGNOR TO F. ROCKWOOD HALL, OF BROOKLINE, MASSACHUSETTS.

PICKER-FEED COTTON-GIN.

SPECIFICATION forming part of Letters Patent No. 319,964, dated June 16, 1885.

Application filed August 11, 1884. (No model.)

*To all whom it may concern:*

Be it known that I, WYMAN DEARBORN, of Boston, in the county of Suffolk and State of Massachusetts, a citizen of the United States, have invented a new and useful Improvement in Picker-Feed Cotton-Gins, of which the following is a full, clear, and exact description, reference being had to the accompanying drawings, forming a part of this specification, in explaining the nature of the improvement, in which—

Figure 1 is a vertical section, and Fig. 2 is a plan, of the apparatus. Fig. 3 is an enlarged view of the roll. Fig. 4 is a perspective view of one of the picker-teeth. Fig. 5 is a transverse section of one of the picker-teeth on the line $x$ $x$, Fig. 4.

This invention relates to an improvement in the machine patented to John B. Brackett and Wyman Dearborn, August 27, 1867, No. 68,035, called in said patent a "Cotton Gin and Picker," but now known as a "Picker-Feed Cotton-Gin."

The object of the present part of my invention is to render more efficient the picker-feed of a cotton-gin, described in the patent referred to, as a substitute for the ordinary feed-table, and also to combine therewith a suction-fan. The separators and improved clearers hereinafter described will form the subject of another application, and are only described in this that the entire machine may be fully understood.

In the said patent of 1867 there were two tooth-carrying shafts, one of them provided with fans arranged in a feed-table and rapidly revolved to loosen, clean, and feed forward the seed-cotton. These tooth-carrying shafts revolved in two transverse fan-chambers of a feed-trunk. The upper side of these fan-chambers was closely covered, and their under side consisted of sieves or gratings through which the dirt might fall, but not into inclosed chambers. In the present improvement these sieves are not exposed, but form the roof of dust-chambers, through which an exhaust apparatus causes a current of air to be drawn, whereby the comfort of the attendant is enhanced by removing much dust and lint from the atmosphere of the gin-house.

The teeth $b$, Figs. 4 and 5, of the pickers are tapered on the sides to an oval section and set with their longer diameter in the direction of the plane of rotation, and their ends are transversely cylindrically convex. It is found that this form of tooth keeps the cotton from tangling with the picker or picker-shaft.

A is a wheel mounted on the main driving-shaft, and belted or geared to a pulley on the first picker-shaft in such manner that the upper part of the first picker, B, shall revolve toward the feed-table C. The shaft of the second picker, D, is made to revolve in the opposite direction by appropriate gearing or belting from the main or secondary shafting, so that the cotton is first carried by the picker B down along the grating B', and then is carried by picker and fan-wheel D up along the cover D'.

The fan-blades upon the wheel D create a current of air through the machine, which blows the cotton forward through the trunk E toward the feed-table F of the cotton-gin proper, and the picker-teeth $b$ thoroughly loosen up the cotton, so that the roll or belt of the gin proper may take better hold of the loose fiber to remove it from the seed, instead of having a matted fiber presented to it, which is difficult to seize, particularly with a short-staple cotton.

A feed-belt, G, may be employed, the upper surface of which runs toward the pickers, in addition to the feed-table C, if desired, and this facilitates the spreading of seed-cotton uniformly. This feed-belt should be arranged to lap horizontally over the inclined feed-table C, so that seed-cotton may drop by gravity into the throat of the picker-casing B' B².

This apparatus is boxed in below at the ends and on the sides by the partitions H H' H², forming a dust-chamber, R S, below the screens B' D², and this dust-chamber, below the picker-feed, is divided into two parts, R S, by the inclined screen I, which has meshes not large enough to allow the passage of seeds. The meshes of screen B' are not large enough to allow the passage of seeds, and those of D² are large enough for this. The partition I' is, in effect, a "swash-plate," catching air and dirt thrown from the picker B on the one side, and checking its motion and directing it downward, and also catching air and dirt thrown from the picker D on the opposite side, and checking its motion and directing it downward. Thus only seeds and the coarser dirt are retained in chamber R, and the finer dust goes into chamber S.

A revolving fan, K, connects by a trunk, K', with dust-chamber S, and discharges at K². This creates a constant current of air through the meshes of the picker-screens B' D², and also of the inclined screen I, and draws away the lighter dirt from the seed-cotton before it enters the gin proper, and without loading the atmosphere of the gin-house, as it did in the apparatus of the patent of 1867.

At the farther end of the trunk E is a deflector, e, which is swung on pivots near its upper edge, and may be drawn in or set out, so as to deliver cotton at desirable points on the feed-table F, for it is often requisite to change the point of delivery, according to the character or condition of the cotton. Sides e' make a hood of this deflector, and its lower edge is provided with a flexible apron, e². The gin proper, to which this picker-feed is attached, may be a "roller-gin," or it may be a "belt-gin" of the form shown in the Brackett and Dearborn patent of March 26, 1867, No. 63,136, which two forms of gin operate upon the same principle of frictional pull upon the fibers of the cotton to drag them from the seeds, and of detaching the seeds from the fiber by blows applied to the seed, which substantial equivalency is hereinafter explained.

The roll L of the cotton-gin proper is situated abreast of the extremity of the feed-table F, and its presser-bar l is placed somewhat below the roll, and between it and the extremity of the feed-table. In this space also vibrate the clearers $l^2$ $l^3$, which clearers are driven by substantially the means described in said Letters Patent No. 63,136—namely, by vibrating levers driven by a crank-shaft and having slotted ends into which sliding boxes fit, the lower end of the nearly vertical bar in which the clearers are mounted being guided by a radius-bar; but in this part of the machine, except immediately at and about the crank-shaft, no substantial improvement is claimed over the device shown in said Letters Patent No. 63,136, in the gap between which the seed-cotton is fed to and the fiber caught by the drawing-surface of the roll, and drawn between the roll L and the presser-bar l, while the clearer $l^2$ in its descent detaches the seed from the fiber, and the clearer $l^3$, as it rises, lifts the seeds up past the edge of the presser-bar, and so gives the roll a better chance to engage with the cotton fiber than it would have were this clearer $l^3$ not present, particularly with cotton of short staple or staple of moderate length.

A double-blade clearer, I am aware, has been heretofore employed, the lower blade of which was provided with saw-teeth and intended to tear or comb the seed from the fiber; but in the present mechanism the lower blade, $l^3$, has a smooth edge, and serves only to lift the seeds upward, so as to bring the fiber attached to them in contact and engagement with the revolving roll L, and thus give the roll a better hold on the fiber or better chance to engage it.

The work of knocking the seeds out against the upper edge of the presser-bar l is done entirely or almost entirely by the upper blade, $l^2$, as is customary in roller-gins. This upper blade, $l^2$, should be, as usual, adjustable. The cotton thus falls on the roll side of the presser-bar l into a chamber, M, and the clean seed falls upon the other side into or toward the chamber N, the two chambers M and N being separated by a partition, m.

Below the clearers $l^2$ $l^3$ may be a screen, O, the meshes of which are not large enough to allow seeds carrying any considerable quantity of cotton to pass through, and so clean seeds only will be collected in the chamber N, and the cotton-carrying seeds left above the screen O; but in lieu of this apparatus I prefer generally to omit the screen O, and introduce instead of it in the chamber N a separator, P, which has an open-work barrel large enough for clean seeds to drop through past the shaft, and not large enough to allow seeds carrying cotton to pass through. This separator P has upon its exterior wings p, and revolves slowly toward the partition m. It will be seen that seeds which are clean of cotton will as they fall strike either on the open-work barrel or on the wings p, and, if clean, drop through the separator P and through a chute placed below it, but not shown in the drawings, into a chamber which is below the separator P, while the seeds carrying cotton will be carried forward and deposited in that part of the chamber N which is nearest the partition m. Thus if the fixed screen O is used it acts as a stationary separator, while if the separator P is used it acts as a moving separator.

In order to provide for wear in the slotted arms Q of the clearer, I line the slots with gibs q, which are adjustable to and from the crank-boxes by means of set-screws q' and drawing-screws $q^2$. These drawing-screws $q^2$ are driven into the gibs and draw them away from the boxes, and in order that this draw may be in some degree self-adjusting I place under the heads of the screws $q^2$ spring-washers $q^3$, of rubber or other resilient material—such as a coiled spring—whereby a constant pressure to draw the gib away from the box is exerted, and a very delicate and fine adjustment may be made.

The roll-surface which I prefer to use is a ribbon of rubber duck, but slightly rubbered and wound spirally about and securely fastened to a shaft of wood or other proper material. It is better to have the ribbon of several plies of duck, and the edges of the spirally-wound ribbon should not butt close, but should be slightly separated. This is shown in Fig. 3, where L' represents the ribbon, and L² the wooden shaft.

For the purposes of a cotton-gin, the cleaning-belt of the Brackett and Dearborn patent of March, 1867, No. 63,136, is the mechanical equivalent of a roll, differing from it only in the facts that it takes hold of the fiber quicker, with a stronger grasp, and holds on longer, and that it is more thoroughly aerated in its revolution than a roll of the same curvature as the sharpest curvature of the belt, or even than a roll of the same superfices, and consequently what is above said about the roll of a roller-gin applies with equal truth to the belt of a Brackett and Dearborn gin.

Having thus fully described my invention, I claim and desire to secure by Letters Patent of the United States—

1. In a picker-feed cotton-gin, the combination, with the feed-table F, of the picker-trunk E and pivoted deflector $e$, provided with sides $e'$, substantially as described.

2. The combination, with the pickers B D and their screens B' D², of the intermediate partition, I', substantially as described.

3. The combination of the picker-trunk E, the pivoted swinging deflector $e$, and the flexible apron $e^2$ with the feed-table F of a cotton-gin proper, substantially as described.

4. The combination, with the dust-chambers R S and screens B' D², of the intermediate screen, I, substantially as described.

5. The screens B' and D², in combination with pickers and with screen I, said screens B' and I having a mesh smaller than that of screen D², and the screen D² having a mesh large enough for the passage of seeds, substantially as described.

WYMAN DEARBORN.

Witnesses:
F. F. RAYMOND, 2d,
FRED. B. DOLAN.